Patented July 2, 1935

2,006,362

UNITED STATES PATENT OFFICE 2,006,362

COLLOIDIZING OF THE MIXED ESTERS OF CELLULOSE WITH THE ALKYLENE HALIDES

Carl J. Malm, Rochester, N. Y., assignor to Eastman Kodak Company, Rochester, N. Y., a corporation of New York No Drawing. Application July 17, 1931, Serial No. 551,545

11 Claims. (Cl. 106—40)

This invention relates to the colloidizing of the higher esters of cellulose, by means of the alkylene chlorides, such as ethylene chloride, by dissolving the ester in the alkylene chloride and evaporating off the solvent.

It has previously been known to colloidize cellulose acetate with acetone to form sheets, filaments or for that matter any colloidized product. However, when it is attempted to colloidize mixed esters with acetone, some of the sheets formed are found to be hazy, some being only slightly hazy while other samples had a marked haziness. Also it was found that sheets of mixed esters which differed only in the proportions of the radicals present, varied to an almost unbelievable extent in their flexibility. For instance samples of cellulose acetate-propionate, in which the proportions of acetyl and propionyl radicals differed, were coated from their acetone solution in sheet form. These sheets were tested on a modified Schopper fold-tester (which is commonly used to determine the flexibility of cellulose derivative sheeting). It was found that the number of folds which would be tolerated by the various samples ranged from 0 to 9¾.

It is well known that the commonly used organic ester of cellulose, cellulose acetate, is insoluble in ethylene chloride, but I have found the surprising fact that the mixed organic esters of cellulose exhibit solubility in ethylene chloride and produce, when dissolved therein, solutions which are eminently suitable for forming sheets, filaments, etc. as disclosed herein.

In contrast to the great variation in flexibility of sheets coated from acetone solutions, sheets of various cellulose acetate-propionates, for instance, coated from ethylene chloride were found to vary as to the number of folds tolerated upon a modified Schopper fold-tester, only, between 6 and 9. Instead of there being brittleness in any of the latter samples, they were all found to have quite satisfactory flexibility. Four of the sheets, which had been coated from acetone, tolerated 0 folds upon being tested. Samples of the four different cellulose acetate-propionates, the sheetings of which tolerated 0 folds when coated from acetone, were dissolved in ethylene chloride and coated out into sheet form. The fold toleration values of these sheets were 6¾, 7, 7½ and 9. It will thus be seen, that when ethylene chloride is employed in coating mixed ester sheeting from a solution of a mixed ester therein, uniformly good results are obtained, in contrast to acetone, which is only suitable for mixed esters having certain proportions of radicals.

I have also found that the mixed esters of cellulose containing plasticizers when coated into films from ethylene chloride, for example, exhibit a marked increase in flexibility and stability over films coated from acetone. This was found to be true with a large number of plasticizers, i. e. even where a large number of coatings were made from acetone solutions of unhydrolyzed acetate propionate and various plasticizers, almost none were found which would maintain flexibility in a 65° C. oven for more than a few days, whereas when ethylene chloride was employed under identical conditions, a number of coatings were obtained with various plasticizers, which maintained flexibility under identical conditions for many weeks. For example skins were coated from acetone and from ethylene chloride each composition of which contained an unhydrolyzed cellulose acetate propionate having a triaryl phosphate content of 25%. The skins were tested initially for flexibility and were then tested for maintenance of stability by keeping them at 65° C. and their fold tolerance was determined every 7 days. The skin coated from acetone containing 25% tricresyl phosphate only had a fold tolerance of 1 initially, while the like skin, of corresponding thickness and plasticizer content, coated from ethylene chloride exhibited a tolerance of 6 folds initially. The skin coated from acetone, when tested after conditioning for 14 days at 65° C., was found to be brittle, while on the other hand the skin coated from ethylene chloride after 42 days at 65° C. exhibited a tolerance of 3 folds.

Skins of cellulose acetate propionate containing 25% triphenyl phosphate were made from an acetone solution and from an ethylene chloride solution, respectively, of the plasticized ester under the same conditions. The skin coated from acetone was found to have a tolerance of 3 folds, when tested on a Schopper fold-tester (which is commonly employed to test the flexibility of sheets or films). The skin coated from ethylene chloride was found to have a tolerance of 10 folds initially, when tested on the fold-tester referred to. The two skins were then subjected to a temperature of 65° C. and, at the end of 42 days, the skin coated from acetone was found to have a fold tolerance of only 1, and that coated from ethylene chloride was found to have a fold tolerance of 6. The same, or even greater contrast between the value of these two solvents, for producing sheets of mixed esters of cellulose, was found to hold in other tests similar to the above in which various other plasticizers were employed instead of the triaryl phosphates. Thus it may be seen that the alkylene chlorides have outstanding and unexpected merit, for the production of various useful products from the higher esters of cellulose. The production of products from the mixed esters of cellulose, by plasticizing them with triaryl phosphates, is disclosed in Clarke and Malm application Serial No. 528,966, filed April 9, 1931.

There are only a few cases where the property of flatness is a characteristic of cellulose derivative sheeting or film. The usual film or sheet exhibits a surface all points of which are not in the same plane, the amount of curvature of such a surface varying with the particular sheeting. I have found that when sheeting is produced by coating from a solution of a mixed ester, such as cellulose acetate-propionate in ethylene chloride, the sheet or film produced has the property of flatness or, in other words, presents a surface sufficiently plane for all practical purposes. This property is important in photographic film to avoid distortion of the image of the film, and is a very unusual and useful property in the case of organic esters of cellulose, particularly when accompanied by good flexibility as in the case of my invention.

It has been known to coat cellulose acetate sheets, from a solution in which a mixture of ethylene chloride and a lower alcohol is the solvent. However, it is impossible to employ ethylene chloride alone for this purpose, primarily due to the poor solubility of cellulose acetate in ethylene chloride. Previous to my discovery, it was not realized that the alkylene chlorides, either by themselves or mixed with the lower alcohols, were suitable for colloidizing various mixed esters of cellulose, and in view of the unsatisfactory experience in the art with attempts to dissolve cellulose acetate in ethylene chloride it is all the more notable a discovery that the alkylene chlorides should be found to contribute such new and unusual properties to cellulose mixed and single higher organic ester compositions.

I have found that the alkylene chlorides, such as methylene chloride, ethylene chloride, propylene chloride etc., are eminently suited for the colloidizing of the mixed esters of cellulose. The colloidized cellulosic materials coated therefrom are found to be uniform, transparent, stable, free from haze and flexible. As is usual with a homologous organic series, the lower members of the present series exhibit greater solubility powers. Where the alkylene chloride is not a solvent for the cellulose ester, as is sometimes the case with the alkylene chlorides above ethylene chloride, other lower boiling solvents such as a lower alcohol may be added, so that a solvent mixture for the cellulose ester is formed. For example, it is well known that cellulose acetate is insoluble in propylene chloride, and this property of insolubility in propylene chloride is also found in some of the mixed esters in which acetyl groups predominate and, in such a case, the addition of alcohol is necessary to promote solubility. In cases where the acetyl groups are present to a less extent, however, such, for example, as cellulose acetate-propionate of more than 15% propionyl content, the mixed esters are soluble in propylene chloride. The presence of higher fatty acid groups tends to promote solubility in propylene chloride, this tendency increasing, of course, with the number of carbon atoms present in the radical. There may be instances where even ethylene chloride will not dissolve the mixed ester of cellulose as, for instance, where it has been hydrolyzed to a point, beyond solubility in ethylene chloride, (the hydrolysis of mixed organic esters of cellulose being described and claimed in Malm and Fletcher application Serial No. 551,546, filed July 17, 1931. In such cases a small amount of a lower alcohol (methyl or ethyl) may, obviously, be added to assist in dissolving the ester.

I have found that the alkylene chlorides, especially ethylene chloride, when employed as the solvent in the colloidizing of cellulose esters, eliminates any danger of haze in the resulting product. This is believed to be due to the formation by the alkylene chloride of an azeotropic boiling mixture with the moisture which may be present. Be that as it may, I have found that coating from an alkylene chloride solution eliminates the variations in the physical properties of films coated under different relative humidity conditions or from dopes containing different amounts of moisture. The moisture in the dope apparently evaporates first upon colloidizing, leaving the cellulosic compound always to form the film from an anhydrous single solvent solution, which bears out my theory as to an azeotropic mixture being present. As is well known the presence of water will cause opacity, and this danger is entirely eliminated, without the necessity of the absolute conditions usually employed in colloidizing processes, such as the coating of film.

I have found that various mixed esters of cellulose, both nitrogen containing and non-nitrogen containing, may be employed. Obviously if desired, a mixture of mixed esters or of a mixed ester and a simple ester such as cellulose stearate, cellulose butyrate etc. may be colloidized by my process. If desired, known plasticizers, such as for instance, the triaryl phosphates or plastic materials such as gums, fats, waxes, resins etc. may be incorporated, if desired, where compatible with the particular composition.

Some of the mixed esters which preferably may be employed are:

Cellulose acetate nitrate
Cellulose acetate propionate
Cellulose acetate butyrate
Cellulose acetate propionate nitrate
Cellulose acetate butyrate nitrate
Cellulose acetate stearate
Cellulose acetate laurate.

The following are given as illustrations of various embodiments of my invention, showing the wide adaptability of my colloidizing process.

100 parts of cellulose acetate stearate of about 37% stearyl content was dissolved in about 800 parts of propylene chloride. The solution was run onto rolls in a heated atmosphere to evaporate the solvent, as is well known. A transparent film or sheet was thus formed which exhibited marked flexibility.

100 parts of a cellulose acetate nitrate, as for example that disclosed in Example I of Staud and Waring application No. 505,958, was dissolved in about 600 parts of ethylene chloride which was then run through an orifice into a coagulating fluid, such as heated air or a liquid bath in which the ester is insoluble. A thread of good brilliance was found to result.

100 parts of a cellulose acetate-propionate, such as for example that disclosed in Example I of Clarke and Malm application No. 520,149, was dissolved in about 600 parts of ethylene chloride together with 30 parts triphenyl phosphate, and was run onto rolls in a warm environment. The ethylene chloride evaporated off leaving a clear, non-hazy coating suitable for film or sheeting, and possessing unusual flatness and flexibility.

100 parts of a cellulose acetate-butyrate, such as disclosed in Example II of Clarke and Malm application No. 520,149, was dissolved in about 1000 parts of methylene chloride. About 40 parts of tricresyl phosphate was added. The solution was roll coated, and the resulting product was found to be a clear and pliable sheeting, suitable for wrapping or other purposes for which thin sheeting (for instance of about .001 in. thickness) is desirable.

My invention is also applicable to the higher simple esters of cellulose, such as cellulose propionate, cellulose butyrate, cellulose laureate etc., by which products of value are produced. For example a cellulose propionate may be dissolved in ethylene chloride and run onto rolls in a warm environment, to leave a clear sheet suitable for photographic films, wrapping purposes, laminating glass etc.

My invention is especially applicable in the finer arts, such as the manufacture of photographic film, where no allowance can be made for defects of any kind in the resulting product. However, numerous other uses of my invention will at once suggest themselves to one skilled in the art. My invention may be utilized in the making of containers for food or other materials, which under ordinary conditions give off or absorb moisture. It can also be employed in the manufacture of sheets for wrapping or mimeograph and stencil work, reinforcing of other materials especially those in layer form such as glass, wood, sheet metal, leather etc., covering of surfaces either with a colored or colorless layer, overcoating of thin sheeting, for instance to protect it from moisture, making of artificial leather, artificial silk manufacture, and plastics. The employment of colloidized mixed esters, in various capacities, is described in more detail in Clarke and Malm applications Nos. 520,151 and 528,966.

Some mixed esters, such as may be suitable in my invention, are disclosed for example in Clarke and Malm Patents Nos. 1,704,282 and 1,800,860 and Staud and Waring applications 505,958, 505,959 and 505,960. Mixed esters are well known in the art at the present time, and any of these which are compatible are within the contemplation of the present invention.

What I claim and desire to secure by Letters Patent of the United States is:

1. A composition of matter comprising a mixed fatty acid ester of cellulose dissolved in a solvent consisting of an alkylene chloride selected from the group consisting of ethylene chloride and propylene chloride as the dissolving element for the mixed ester.

2. A composition of matter comprising a mixed fatty acid ester of cellulose dissolved in a solvent consisting of ethylene chloride as the dissolving element for the mixed ester.

3. A composition of matter comprising a mixed fatty acid ester of cellulose dissolved in a solvent consisting of propylene chloride as the dissolving element for the mixed ester.

4. A composition of matter comprising a cellulose acetate propionate dissolved in a solvent consisting of ethylene chloride as the dissolving element for the cellulose acetate propionate.

5. A composition of matter comprising a cellulose acetate propionate dissolved in a solvent consisting of propylene chloride as the dissolving element for the cellulose acetate propionate.

6. A composition of matter comprising a cellulose acetate butyrate dissolved in a solvent consisting of ethylene chloride as the dissolving element for the cellulose acetate butyrate.

7. A composition of matter comprising a cellulose acetate butyrate dissolved in a solvent consisting of propylene chloride as the dissolving element for the cellulose acetate butyrate.

8. A composition of matter comprising a cellulose ester selected from the group consisting of cellulose acetate propionate and cellulose acetate butyrate, which has a content of at least 15% of acyl groups of 3 to 4 carbon atoms, dissolved in a solvent selected from the group consisting of ethylene chloride and propylene chloride as the dissolving element for the cellulose ester.

9. A composition of matter comprising a cellulose ester selected from the group consisting of partially hydrolyzed cellulose acetate propionate and partially hydrolyzed cellulose acetate butyrate, dissolved in a solvent consisting of ethylene chloride as the dissolving element for the cellulose ester.

10. A composition of matter comprising a partially hydrolyzed cellulose acetate-butyrate, dissolved in a solvent consisting of propylene chloride as the dissolving element for the cellulose acetate-butyrate.

11. The process of colloidizing a mixed fatty acid ester of cellulose which comprises dissolving it in a solvent selected from the group consisting of ethylene chloride and propylene chloride as the dissolving element for the ester and then removing the solvent by evaporation.

CARL J. MALM.